United States Patent [19]

Buchner

[11] Patent Number: 4,741,156
[45] Date of Patent: May 3, 1988

[54] PROCESS FOR IGNITING A REGENERATIVE SOOT FILTER IN THE EXHAUST GAS CONNECTION OF DIESEL ENGINES

[75] Inventor: Helmut Buchner, Baltmannsweiler, Fed. Rep. of Germany

[73] Assignee: Daimler-Benz Aktiengesellschaft, Stuttgart, Fed. Rep. of Germany

[21] Appl. No.: 922,952

[22] Filed: Oct. 24, 1986

[30] Foreign Application Priority Data

Oct. 26, 1985 [DE] Fed. Rep. of Germany ....... 3538148

[51] Int. Cl.$^4$ .................... F01N 3/02; F28D 15/00
[52] U.S. Cl. .................. 60/303; 55/DIG. 30; 60/311; 165/104.12; 423/644
[58] Field of Search .............. 165/104.12; 423/644; 432/30; 44/2, 3 B; 60/311, 303, 286, 274; 55/DIG. 30

[56] References Cited

U.S. PATENT DOCUMENTS 4,161,211  7/1979  Duffy ..................... 165/104.12
4,200,144  4/1980  Sirovich ................ 165/104.12
4,330,084  5/1982  Buchner ............... 165/104.12

FOREIGN PATENT DOCUMENTS 2756570  9/1978  Fed. Rep. of Germany.
3159565  8/1982  Fed. Rep. of Germany.
3322439  1/1985  Fed. Rep. of Germany ........ 60/297
  73013  4/1985  Japan .............................. 165/104.12
 190613  9/1985  Japan .............................. 60/303

Primary Examiner—Douglas Hart
Attorney, Agent, or Firm—Barnes & Thornburg

[57] ABSTRACT

A process for the ignition of a regenerative soot filter adapted to be ignited in which the temperature, respectively, heat quantity necessary for the ignition of the filter is produced by charging a storage container located ahead of the soot filter or in connection with the soot filter which contains a hydride-forming alloy or a hydride-forming material. The necessary hydrogen is taken from a second storage container with a different alloy storing hydrogen, which is brought to a temperature by the exhaust gases so that a sufficient hydrogen pressure results therefrom. After the ignition, the second storage container is cooled off and the hydrogen is again conducted from the first storage container heated by the exhaust gases back into the second storage container so that the ignition operation can be repeated with renewed heating of the second storage container.

8 Claims, 1 Drawing Sheet

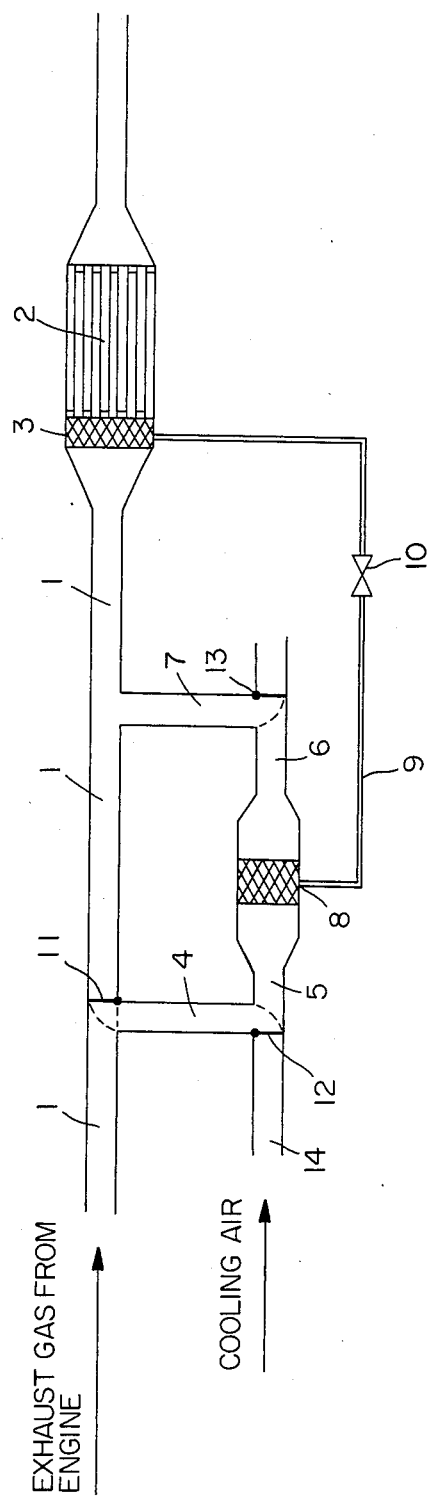

PROCESS FOR IGNITING A REGENERATIVE SOOT FILTER IN THE EXHAUST GAS CONNECTION OF DIESEL ENGINES

The present invention relates to a process for igniting a combustible soot filter, especially for diesel engines to effect regeneration thereof.

For limiting the particle emission in diesel engines, whose maximum limits are already prescribed in some countries by law, the diesel engine exhaust gas is conducted over filters which retain the largest part of the soot particles. Such filters consist of aluminum-oxide-coated wire meshes, ceramic fibers, ceramic honeycomb structures or ceramic foams whereby honeycomb structures and foams have proved particularly appropriate and effective.

In the course of the separation of the soot particles, the pores of the filters become clogged up so that the counterpressure ahead of the filter rises. As soon as the counterpressure assumes an extent no longer tolerable with a view toward the fuel consumption and the engine operation, the filter must be regenerated which, as is already indicated by the term "soot combustion filter", takes place by combustion of the soot particles on the filter. It is known that for this combustion process temperatures above 600° C. as also sufficient oxygen must be present for maintaining the combustion.

As the exhaust gas temperatures do not reach under all load conditions of the engine the level necessary for the ignition of the soot combustion filter, numerous processes have been described in order to ignite a soot combustion filter.

Among others, it was proposed to lower the ignition temperature by a catalytic coating of the soot combustion filter or by spraying onto the covered filter a substance effecting the ignition or to increase the temperature of the exhaust gases either by an increase of the engine load by engaging a throttle valve in the exhaust connection (engine brake) of a retarder or of the vehicle brake or by direct heat-up of the exhaust gases by means of a burner in the exhaust connection or by electric heating.

Whereas the catalytic processes do not yet operate satisfactorily in the lower temperature range and therebeyond also possess a limited length of life, the other processes are dependent on the consumption of additional energy.

The present invention is concerned with the task to find a process for the ignition of a soot combustion filter in the exhaust gas connection of diesel engines by means of which the ignition temperature of the soot combustion filter is attained with certainty and which does not use any additional energy for its operation.

The underlying problems are solved according to the present invention in that a first storage container located in the exhaust gas connection directly ahead of or in heat-conducting connection with the soot combustion filter, which contains a hydride-forming alloy or a hydride-forming metal that heats up with a charge with hydrogen under a pressure of 5 bar or more to a temperature of at least 650° C., is charged under this pressure with hydrogen, in that the hydrogen is taken from a second storage container which contains a hydride-forming metal or a hydride-forming alloy that releases hydrogen at a temperature of 250° to 400° C. under a pressure of more than 5 bar and which is heated up to this temperature by the exhaust gases, and in that after the ignition of the soot combustion filter, the second storage container is cooled to a temperature at which a hydrogen pressure of one bar or less will establish within the same and in that the hydrogen is conducted back out of the first storage container which is heated-up by the exhaust gases into the second storage container.

The process according to the present invention thus utilizes the high heat content of the exhaust gases at a relatively low temperature level in order to bring this heat by means of a "heat transformer" to a temperature level necessary for the ignition of the soot combustion filter. For producing the high temperature, a storage container or tank arranged in the exhaust gas connection directly ahead of the soot combustion filter or in heat-conducting connection with the soot combustion filter that contains a hydride-forming alloy or a hydride-forming material which with a charge with hydrogen under a pressure of 5 bar or more heats up to a temperature of at least 650° C., is charged with hydrogen under this pressure. As a result of the hydride formation heat, the storage container or tank heats up very strongly and transmits its heat to the exhaust gas, respectively, directly to the soot combustion filter which is ignited thereby. The use of a pressure of about 5 to 10 bar is preferred in this first storage container or tank because in this case the container or tank can be constructed still relatively light-weight as such. A suitable metal, which may be used in the first container or tank, is, for example, titanium in powder form, which heats up with the charge under a hydrogen pressure of 5 to 10 bar to temperatures of 750° C. and higher. The temperature, at which, for example, titanium powder begins to react with hydrogen, lies at approximately 400° C. and the storage container or tank is kept at this temperature by the exhaust gases.

The hydrogen required for the reaction is taken from a second storage container or tank which contains a hydride-forming metal or hydride-forming alloy which is charged with hydrogen and which releases the hydrogen at a temperature of 250° to 400° C. under a pressure of more than 5 bar. The second storage container or tank is heated to this temperature by the exhaust gases. If one now permits the hydrogen to flow from the second storage container or tank into the first one, then the latter heats, as mentioned, to temperatures of at least 650° C. and can produce therewith sufficient heat for the ignition of the soot combustion filter.

After the ignition has taken place, the heating of the second container is turned off and the second container is cooled off, for example, by the ambient air or by the dynamic air pressure. With a decreasing temperature, also the hydrogen pressure in the second container drops. As soon as the hydrogen pressure in the first container which is heated by the exhaust gases (approximately 300° to 400° C.), is larger than the hydrogen pressure in the second container, the hydrogen is returned from the first container and stored again in the second container. In order that this takes place with sufficient speed, a storage material should be used in the second container which possesses at room temperature approximately a hydrogen decomposition pressure of about one bar or less. Therebeyond, the storage material in the second container appropriately should not produce during the heat up by the exhaust gases a larger pressure than about 10 bar in order to be able to keep the container weight within limits. Suitable alloys which satisfy these requirements are, for example, TiNi or Mg₂Ni.

The second container is therefore so arranged that, on the one hand, it can be heated up by the exhaust gases but on the other hand can also be cooled off. The ignition operation can then be initiated simply by a heat-up of the second container. As soon as the ignition operation is terminated, the heating of the second container is simply turned off again, the container cools off and the hydrogen is forced back into the second container. As the regeneration, that is, the recharging of the second container with hydrogen follows directly an ignition operation for the soot combustion filter, it is also assured that the storage material in the second container is at a temperature in which it reacts spontaneously with hydrogen. However, the storage materials suitable for the second storage device which release hydrogen under a pressure of 5 to 10 bar at temperatures of 250° to 400° C., generally react wtih hydrogen at temperatures far below the zero point with still sufficient speed.

The process according to the present invention thus operates wtihout consumption of primary energy because the exhaust gas heat which would otherwise escape uselessly is utilized for the ignition of the soot combustion filter.

The heat formation of TiH₂ amounts to −120kJ/mol H₂ and the heat formation of TiNiH amounts to −40kJ/mol H₂. If one seeks to produce during ten minutes an output of 10kW at a temperature level of about 700° C., then the first storage container located ahead of the soot combustion filter must contain 4 kg titanium powder. The second storage container from which hydrogen is taken is filled with 15 kg TiNiH. The heat quantity required for its heat-up is removed appropriately from the exhaust gases downstream of the soot combustion filter. In order to assure that an initiated ignition operation can also be brought in every case to a termination, the quantity of titanium in the first storage container is so selected that the heat quantity which is required for the release of the hydrogen from the second storage container is still released in the first container. Even if the vehicle engine should be operated suddenly at idling after the initiation of the ignition operation, the produced heat quantity suffices in order to keep the exhaust gas at a temperature level which enables the reliable release of the hydrogen from the second storage container under a sufficient pressure. If one utilizes in the second storage container Mg₂NiH₄, which possesses a formation enthalpy for the hydride of −70kJ/mol H₂, then one requires under the same conditions 6 kg titanium in the first and 6 kg Mg₂Ni in the second storage container. If one dispenses with the requirement that the heat quantity which is released during the charge of the first storage container must still suffice in order to push the hydrogen completely out of the second storage container, i.e., if one starts with the fact that the exhaust gases are present predominantly at a sufficient temperature level for the discharge of the second storage container, then a considerable quantity in storage material can additionally be economized.

Therebeyond, consideration should be given to utilize a compressor for the recharge phase in order thereby to enlarge the hydride selection, respectively, to increase the temperature range.

BRIEF DESCRIPTION OF THE DRAWINGS

The single drawing FIGURE shows a schematic illustration of a preferred embodiment of the present invention.

DETAILED DESCRIPTION OF THE DRAWINGS

The drawing FIGURE shows an exhaust pipe 1 which carries exhaust gas from the engine. A bypass is arranged in this exhaust pipe 1 and includes pipes 4, 5, 6 and 7. Flow through the bypass is controlled by valve flaps 11, 12 and 13 into the position shown. The soot combustion filter 2 is arranged in the exhaust pipe 1, with a first storage container 3 located directly ahead of the soot combustion filter 2 in heat connection. This first storage container contains a hydride-forming alloy or a hydride-forming metal that heats up to a temperature level of at least 650° C. when charged with hydrogen under a pressure of 5 bar or more.

Included in the bypass 4, 5, 6 and 7 is the second storage container 8 which contains a hydride-forming metal (or a metal hydride when the metal is charged with hydrogen) or a hydride-forming alloy (also a hydride when charged with hydrogen). The metal hydride or metal alloy hydride releases, at a temperature within the range of 250° to 400° C., hydrogen under a pressure of more than 5 bar in the first storage chamber 3, when the metal hydride or metal alloy hydride is heated up by the exhaust gases to a temperature of 250° to 400° C. The hydrogen released from the metal hydride or metal alloy hydride when the second storage container 8 is heated, flows through a connecting pipe 9 between the second storage container 8 and the first storage container 3, this flow being controlled by the valve 10 in the pipe 9. After the ignition of the soot combustion filter 2, the second storage container 8 is cooled by air, either from the opening of the flap to a pipe which lets in cooling air 14, or by radiation. A hydrogen pressure of 1 bar or less will establish itself within the second storage container 8, so that the hydrogen from the first storage container 3 is conducted back through pipe 9 into the second storage container 8.

While I have described only one embodiment of a process in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A process for the ignition of a soot combustion filter in an exhaust gas connection of a diesel engine, comprising the steps of charging with hydrogen under a pressure of 5 bar or more a first storage container in heat-conducting connection with the soot combustion filter, said first storage container containing at least one of a hydride-forming alloy and a hydride-forming metal that heats up to a temperature level of at least 650° C. when charged with hydrogen under a pressure of 5 bar or more, taking the hydrogen from a second storage container which contains at least one of a metal hydride and a metal alloy hydride that releases, at a temperature within the range of 250° to 400° C., hydrogen under a pressure of more than 5 bar in said first storage chamber, at least one said metal hydride and a metal alloy hydride being heated up by the exhaust gases to a temperature within the range of 250° to 400° C., cooling the second storage container after the ignition of the soot combustion filter to a temperature at which a hydrogen pressure of 1 bar or less establishes itself within the second storage container, and conducting the hydrogen from the first storage container, which is heated up by the exhaust gases, back to the second storage container.

2. A process according to claim 1, wherein at least one of said hydride-forming alloy and the hydride-forming metal present in the first storage container is so selected in its quantity that the heat quantity released during the charge supplies additionally the energy required for the release of the hydrogen.

3. A process according to claim 2, wherein titanium is used as hydride-forming metal in a first storage container.

4. A process according to claim 3, wherein TiNi or $Mg_2Ni$ is used as a hydride-forming alloy in the second container.

5. A process according to claim 1, wherein titanium is used as hydride-forming metal in a first storage container.

6. A process according to claim 1, wherein at least one of TiNi and $M_2Ni$ is used as a hydride-forming alloy in the second container.

7. A process according to claim 6, wherein titanium is used as hydride-forming metal in a first storage container.

8. A process according to claim 1, wherein said first storage container is located in the exhaust gas connection directly ahead of said soot combustion filter.

* * * * *